(12) United States Patent
Ghezzi

(10) Patent No.: US 8,075,001 B2
(45) Date of Patent: Dec. 13, 2011

(54) CHUCK AND ROTARY ORIENTING DEVICE

(75) Inventor: Luigi Ghezzi, Grenchen (CH)

(73) Assignee: Gemenda AG (CH)

( * ) Notice: Subject to any disclaimer, the term of this patent is extended or adjusted under 35 U.S.C. 154(b) by 1014 days.

(21) Appl. No.: 11/988,509

(22) PCT Filed: Jul. 5, 2005

(86) PCT No.: PCT/CH2005/000379

§ 371 (c)(1),
(2), (4) Date: Jan. 4, 2008

(87) PCT Pub. No.: WO2007/003060

PCT Pub. Date: Jan. 11, 2007

(65) Prior Publication Data

US 2009/0051128 A1    Feb. 26, 2009

(51) Int. Cl.
*B23B 31/107* (2006.01)
(52) U.S. Cl. .......................... 279/57; 279/74
(58) Field of Classification Search .............. 279/55, 279/57, 74, 82, 58, 79, 80
See application file for complete search history.

(56) References Cited

U.S. PATENT DOCUMENTS

| | | | | |
|---|---|---|---|---|
| 899,679 A | * | 9/1908 | Powers | 279/57 |
| 943,863 A | * | 12/1909 | Clouse | 279/82 |
| 1,184,758 A | * | 5/1916 | Leland | 279/56 |
| 1,524,672 A | * | 2/1925 | Rabut | 451/375 |

(Continued)

FOREIGN PATENT DOCUMENTS

GB        1 407 441 A        9/1975

(Continued)

OTHER PUBLICATIONS

International Search Report issued on Oct. 6, 2006 in connection with corresponding International Application No. PCT/CH2005/000379.

*Primary Examiner* — Daniel Howell
*Assistant Examiner* — Paul M Janeski
(74) *Attorney, Agent, or Firm* — Lerner, David, Littenberg, Krumholz & Mentlik, LLP

(57) ABSTRACT

Disclosed is a chuck comprising a base (10) in which a plurality of radially continuous, longitudinal slots (41) are provided for an individual clamping jaw (11, 21), respectively. The clamping jaws (11, 21) encompass one respective stopping surface (34) and can be displaced radially relative to the base (10) when a slanted clamping jaw surface (34) and a complementary surface (4) are moved towards each other such that a surface (14) of each clamping jaw (11, 21) clamps a workpiece that is to be retained around the longitudinal axis (20) of the base (10). Each clamping jaw (11, 21) is provided with a stop area (33 or 29) that extends on a plane running perpendicular to the longitudinal axis (20) of the base (10). Said stop area is impinged upon by a certain force in a longitudinal direction (20) during clamping by establishing a direct positive connection with a complementary area of an actuating element (3) or a positive connection with a complementary area of the base (10) which is positively connected to the actuating element (3). Force is thus relieved from the base, and the clamping jaws can be replaced individually. Non-round objects can be clamped in a simple way while objects can be clamped by engaging the same from behind.

7 Claims, 3 Drawing Sheets

U.S. PATENT DOCUMENTS

| | | | | |
|---|---|---|---|---|
| 1,822,685 A | * | 9/1931 | Wilson | 279/55 |
| 1,907,553 A | * | 5/1933 | Lundin | 279/55 |
| 2,430,761 A | * | 11/1947 | Duphily | 279/74 |
| 3,123,370 A | * | 3/1964 | Unander | 411/31 |
| 3,659,864 A | * | 5/1972 | Blattry | 279/121 |
| 4,213,355 A | * | 7/1980 | Colvin | 81/128 |
| 4,775,160 A | | 10/1988 | Manschitz | |
| 5,833,405 A | * | 11/1998 | Nielsen | 408/226 |

FOREIGN PATENT DOCUMENTS

| JP | 60-146605 U | 9/1985 |
|---|---|---|
| JP | 62-057806 A | 3/1987 |
| JP | 03-256605 A | 11/1991 |
| JP | 05-185308 A | 7/1993 |

* cited by examiner

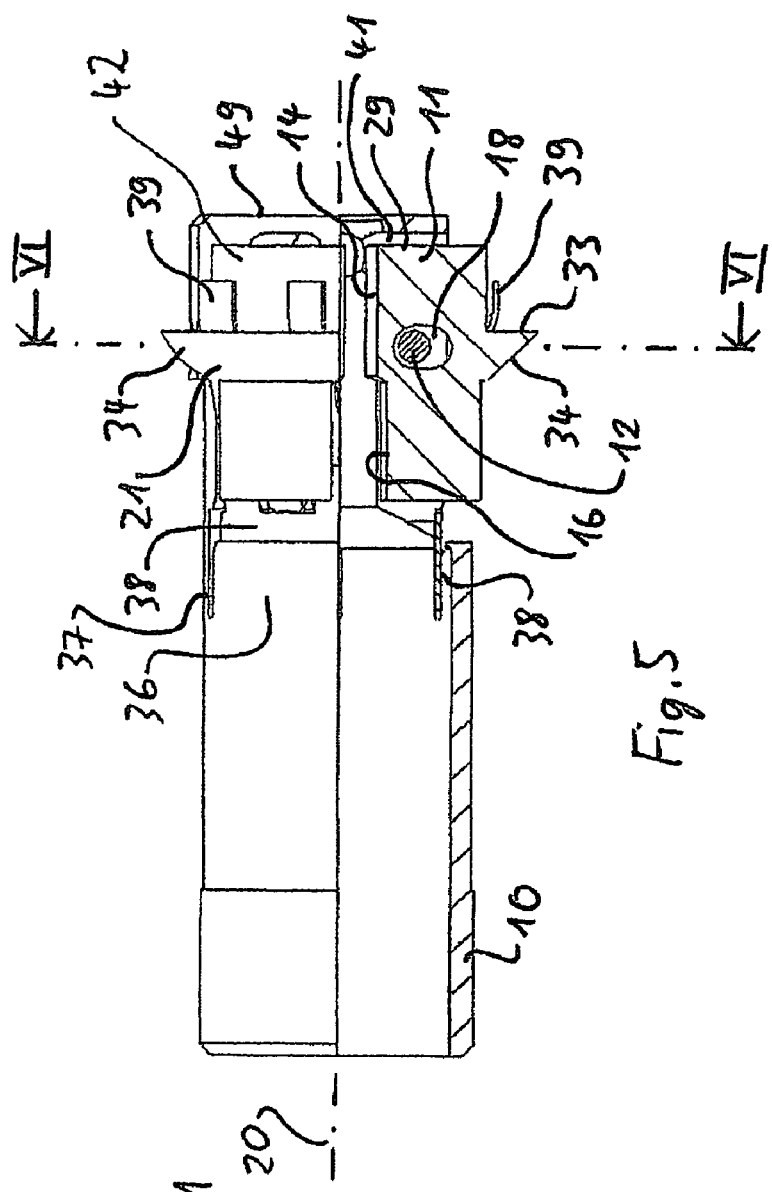
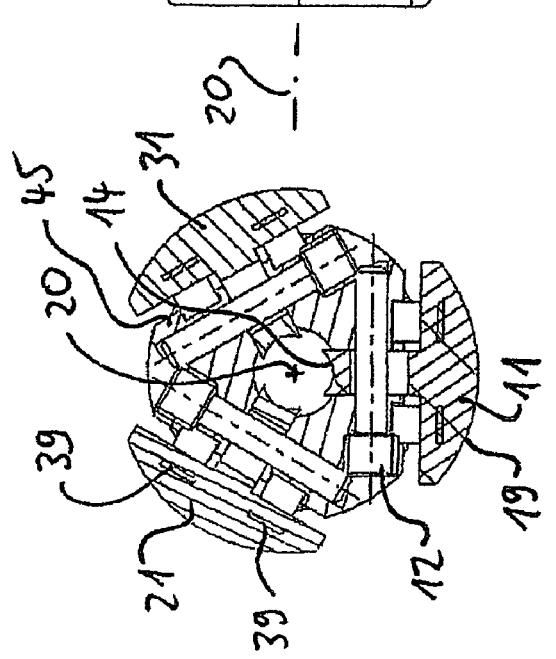
Fig. 5
Fig. 6

CHUCK AND ROTARY ORIENTING DEVICE

TECHNICAL FIELD OF THE INVENTION

The invention relates to a chuck which can be used as a universal gripper, as a chuck in drilling machines, as a gripper in machine tools and as a chuck in lathes or turning machines. The invention also relates to a rotary orienting device for such a universal gripper.

PRIOR ART

The prior art discloses a number of chucks, as known, for example, from GB 1 407 441. In that document can be found a basic body in which a cruciform slot for four individual clamping jaws is provided. The clamping jaws firstly each comprise a trapezoidal part which is inserted into the corresponding grooves. Here, a beveled surface lies opposite a likewise trapezoidal actuating element assigned in a complementary manner in each case. When combined, the two elements can produce a parallelepiped when seen in a side view. The fact that they can be displaced axially relative to one another means that the clamping jaws can each be displaced inwardly or outwardly. For this purpose, a sleeve is screwed onto the basic body and it has an actuating surface by means of which the actuating elements can be displaced axially. It is possible in a simple manner for individual jaws to be replaced in this chuck.

A similar design of clamping jaws is disclosed in WO 02/058870 in which three such clamping jaws are mounted on a basic body. In this case, each clamping jaw has a respective spring provided therein that presses the clamping jaw away from the basic body. The sleeve according to WO 02/058870 does not engage over the clamping jaws here, but embraces the run-on surfaces which are inclined in a complementary manner to the clamping jaws.

Furthermore, it is known, for example, from DE 2 524 327 to use only two mutually opposite clamping jaw elements which allow objects to be held eccentrically.

FR 2 282 965 also discloses controlling existing jaws in different ways.

It is required in many applications to grip and clamp objects in a region which has a smaller diameter than regions in the direction of the two opposite ends. The prior art does not provide any suitable solution to achieve this.

Taking this prior art as a starting point, the object on which the invention is based is to design a universal gripper of the aforementioned type which allows the use of elements to be clamped which have to be guided through the clamping jaws by a portion which is larger than the diameter to be clamped.

A further aim is to provide a clamping jaw which makes it possible to achieve high-quality work results on lathes, turning machines etc. without the clamping jaws leaving visible impressions on the material.

A further object of the invention is to reduce wear on the clamping jaws and in particular to achieve a concentric running of the clamped objects in the range of a few micrometers, even after some 10 000 clamping operations. If a clamping jaw is damaged, the device as a whole should be ready for use again in the shortest possible time, the features of the invention assisting the rapid replacement of an individual clamping jaw.

Furthermore, it is an aim of the invention to clamp non-round elements, to clamp in a space-saving manner and to make it possible to work directly in metric or in inch measurements.

SUMMARY OF THE INVENTION

The above object is achieved according to the invention by a universal gripper having the characterizing features of claim 1. A clamping jaw according to the invention is characterized in claim 7 or 8. A rotary orienting disk according to the invention is characterized in FIG. 10.

The fact that the basic body remains without loading in principle means that its sleeve has a long useful life, while the clamping jaws can be exchanged in a short time, for example in less than a minute in tests conducted by the Applicant.

Further advantageous embodiments are characterized in the subclaims.

BRIEF SUMMARY OF THE DRAWINGS

The invention will now be described in more detail by way of example with reference to the appended drawings in which:

FIG. 5 shows a partially sectioned side view of a universal gripper according to the invention as shown in FIG. 1 with clamping jaws as shown in FIG. 2, superimposed with a representation of the spring elements when no clamping jaws are inserted; and FIG. 6 shows a front sectional view of the device as shown in FIG. 5 along the line VI-VI.

DETAILED DESCRIPTION OF EXEMPLARY EMBODIMENTS OF THE INVENTION

Figure 1:
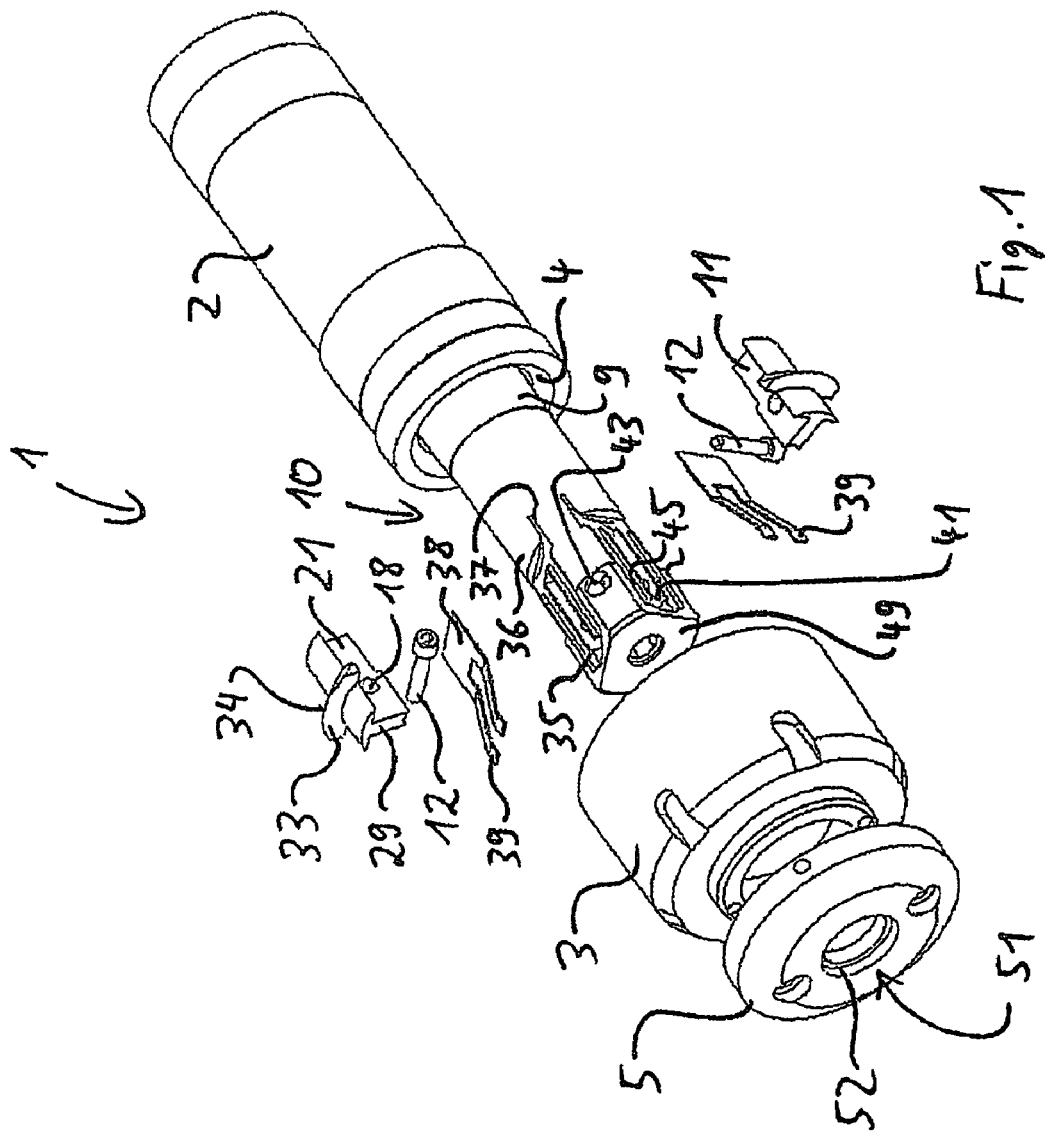
FIG. 1 shows a perspective exploded view of a universal gripper according to the invention comprising a rotary orienting disk sleeve.

FIG. 1 shows an overall view of a universal gripper 1 in an exploded representation. It is pushed from the front into a sleeve 2 which is rotatably mounted. The universal gripper 1 comprises a basic body 10 on which three clamping jaws 11, 21 and 31 (see FIGS. 2 and 3) are mounted. Each clamping jaw 11, 21 or 31 has an associated fastening pin 12 which projects through an oblong hole 18 provided in the clamping jaw 11, 21 or 31.

Figure 2:
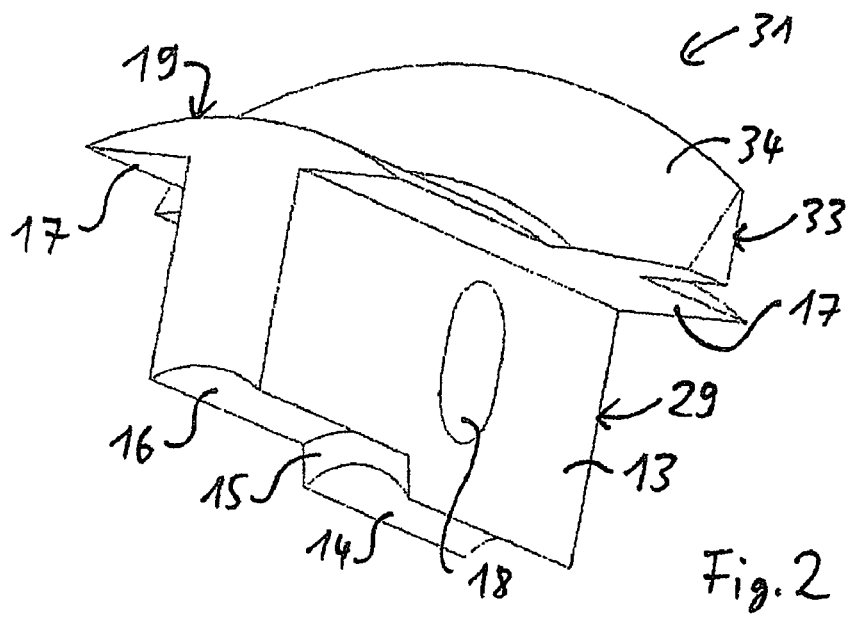
FIG. 2 shows a perspective view of a clamping jaw shown in FIG. 1 from below.
Figure 3:
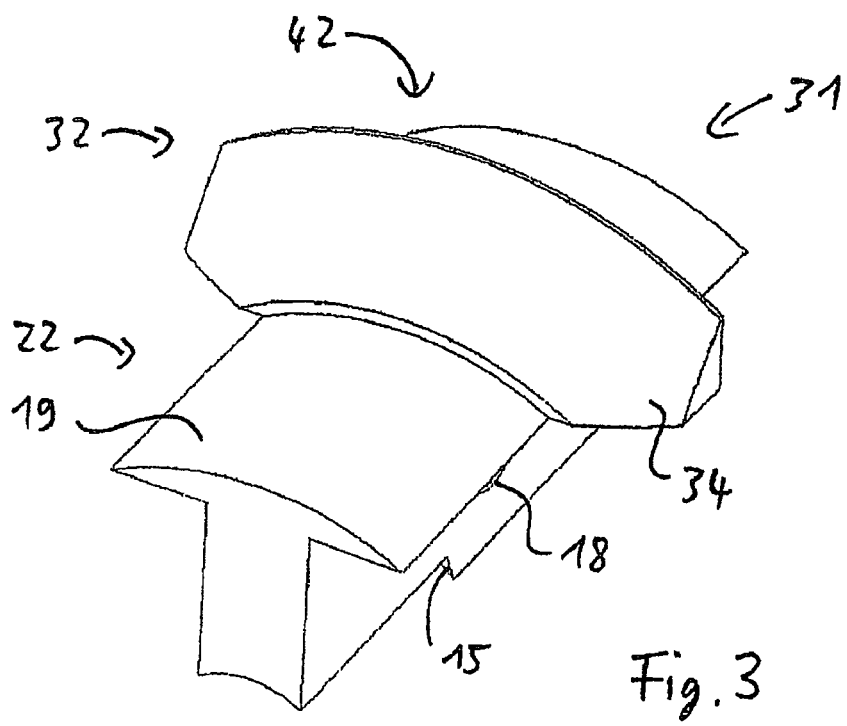
FIG. 3 shows a perspective view of a clamping jaw shown in FIG. 1 from above.

A clamping jaw 31 is described in more detail in conjunction with FIGS. 2 and 3, which each show a different perspective view of a clamping jaw 31. Identical features are in each case provided with identical reference numbers in all drawings. The clamping jaw 31 has a substantially parallelepipedal basic body 13 with a clamping jaw lower surface 14 which is offset via a step 15 and merges into a set-back surface 16. It is possible, in particular in the longitudinal direction of the clamping jaw 31, for the set-back surface 16 to be slightly inclined, that is to say rising toward the step 15 in order to make it easier to withdraw a mounted object. The rising inclination of the set-back surface 16 here can be such that the step 15 is omitted and the set-back surface 16 reaches right up to the clamping jaw lower surface 14.

The clamping jaw surface 14 is concaved on the lower side so as to be able to accommodate and clamp a corresponding round article. Special sets of clamping jaws 11, 21, 31 can also have different clamping jaw surfaces 14, in particular in order to mount workpieces eccentrically. The concave surface 14 makes it possible to clamp elements whose diameter, or whose local diameter at the location of the respective clamping jaw 11, 21, 31, is smaller.

The smaller diameter of the oblong hole 18, extending radially with respect to the curvature of the lower surface 14, is in each case advantageously somewhat larger than the diameter of the pin 12, with the result that the clamping jaw 31 can move with clearance in its longitudinal direction if such a pin 12 is secured, for example, in the basic body 10. As seen in a front or rear view, the clamping jaw 11 is formed in a T shape with the basic body 13, with a flange surface 17 being provided on both sides of the basic body 13. The flange surface 17 can, in particular, be curved (for example like the flange surface 14) or be planar. The upper side 19 of the clamping jaw 11 is divided into three portions 22, 32 and 42 in its longitudinal direction.

The functionally most essential part is the central part 32 which, on the side 33 facing the workpiece to be inserted, comprises an abutment surface 33 extending in the orientation (i.e. longitudinal direction) of the oblong hole 18. On the opposite side is a conical taper or cone surface 34 which can be curved convexly, in particular also in the transverse direction of the clamping jaw 31. The front and rear regions 22 and 42 of the upper side 19 of the clamping jaw 11 are curved with respect to an axis which is aligned with the center axis of the basic body 10.

Three bearing surfaces 35 are provided here on the basic body 10, these surfaces being planar and, on the insertion side for the sleeve 2, merging into a slot 37 which is covered by a circular segment 36 (as seen in section in a front view) of the basic body 10. These bearing surfaces 35 are each bounded laterally, and if appropriate to the front, by bearing edges 45. There thus results a step on which U-shaped ends 49 of a leaf spring 38 can be set down. In addition, the leaf spring 38 can be introduced into said slot 37. The bottom of the U of the spring 38 can be plugged into the slot 37 and the two free ends 39 of the spring 38 that are preloaded away from the basic body 10 are arranged to the left and right of a radial slot 41 in which the basic body 13 of the clamping jaw 11, 21 or 31 can be inserted. Instead of the springs 38 being clamped in the slots 37, it is also possible for said springs to be screwed firmly in the region of the slots 37 (which are then not present) or to be fastened in some other way to the basic body 10, for example by welding, in particular spot welding.

It is thus possible—this being the smallest possible clamping diameter—for the clamping jaw 11, 21 or 31 to bear by its lower side 17 on the surface 35, being separated only by the interposed free arms 39 of the leaf spring 38. The pins 12 are plugged into bores 43 extending parallel to the surface 35, these pins projecting through the oblong holes 18 in the clamping jaws 11, 21 or 31. Thus, the clamping jaws 11, 21 or 31 when in the inoperative position are brought into the outermost radial orientation by the pressure of the free ends 39 of the spring 38 that is applied to the lower sides 17 of the clamping jaws 11, 21 or 31. When inserting the basic body 10 into the sleeve 2, the conical surfaces 34 run against complementarily formed surfaces 4, preferably in the mouth region, of the sleeve 2, and are thus pressed down together toward the main axis of the basic body 10 against the force of the spring 38. The bores 43 can also extend obliquely.

There are a number of possible ways of moving the basic body 10 translationally with respect to the sleeve 2. One possible way comprises the provision of a thread on the basic body 10 on its end 9 which is mounted in the sleeve 2, in which case the basic body 10 is caused to move translationally into the sleeve 2 by rotating a corresponding outer sleeve which is arranged in or behind the sleeve 2. The other possible way, which is represented here in FIG. 1, involves the provision of a sleeve 3 which is provided on its inner side (not shown in FIG. 1) with stop surfaces which either press against the surface 33 onto the clamping jaws 11, 21 or 31, or onto the front side 49 of the basic body 10. In the case of direct action on the front side 33 of the clamping jaws 11, 21 or 31, the transmission of force by the complementary surfaces 4 and 34 is direct. In the case of action on the front side 49 of the basic body 10, each clamping jaw 11, 21, 31 is moved by its front surface 29 toward a corresponding front opening of the slot 41 that is situated in the sleeve 10, and is thus pushed indirectly onto the surfaces 4 and 34. In both cases, the basic body 10 at most experiences a translatory transmission of force, but does not experience any radial forces.

In FIG. 1, a rotary orienting disk 5 which has a cylindrical outer shape and a central bore 51 in the front region is provided on the sleeve 3. This continuous bore 51 widens out on the outwardly extending mouth of the rotary orienting disk 5 via a step 52. It is thus possible to provide in the opening 51 in each case a corresponding insert piece (not shown here) having a central bore which is designed in a complementary manner to, for example, the screw head which is to be held in the universal gripper 1. Thus, such a workpiece to be machined is held for concentric running by the clamping jaws 11, 21 and 31 and, in addition, the head of the workpiece is additionally supported at a certain distance in front of the mounting of the clamping jaws 11, 21 and 31 by means of the insert piece which can be inserted into the opening 51.

Figure 4:
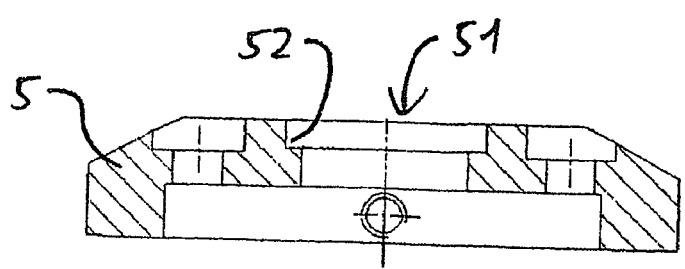
FIG. 4 shows a cross-sectional view of a rotary orienting disk according to the invention.

FIG. 4 shows a cross-sectional view of such a rotary orienting disk 5. The inserts provided for the central bore 51 are preferably inserted into the step 52, advantageously with a slight press fit so that the insert is held before the head of a workpiece to be clamped is to be held; on the other hand, however, such an insert can also be removed and replaced in a simple manner.

The design of this universal gripper particularly allows the insertion and subsequent machining of screws which have a thread of larger diameter than the remainder of the shank and simultaneously have a screw head which is also to be machined. Specifically, the machined thread is then to be introduced into the rear region of the basic body, that is to say over the clamping jaw surfaces 14 subsequently encompassing the smaller shank. The region of the rear surface 16 or the free region behind it is designed for this purpose if the clamping jaws 11, 21 or 31 are of short enough design in the longitudinal direction.

FIG. 5 shows a partially sectioned side view of a universal gripper according to the invention as shown in FIG. 1 with clamping jaws as shown in FIG. 2, and FIG. 6 shows a sectioned front view of the device as shown in FIG. 5 along the line VI-VI. Here, both FIG. 5 and FIG. 6 represent superimposed drawings in which, on the one hand, the inserted clamping jaws 11, 21, 31 are represented and, on the other hand, also the spring elements 38 are represented when no clamping jaws 11, 21, 31 are inserted. Thus, the spatial relationships can be clearly seen. The clamping jaws 11, 21, 31 are represented in a partially clamped state. Furthermore, FIG. 6 shows the two parallelepipedal spring ends 39 as they would appear if no clamping jaw 11, 21 or 31 were introduced. They are thus represented in the free, released state. This means that, in the representation shown in FIG. 5, the spring 38 is situated below the segment 36 at the start of the U, the free ends then initially remain virtually below the clamping jaw 21 and extend only in the front region 42 above the clamping jaw 21 represented in the clamped state. This also reveals the extent of the clamping travel which, on the other side, depends in its maximum stroke on the radial height of the cone surface 34.

It should be noted that, instead of the pins 12, other holding elements for the clamping jaws 11, 21, 31 can also be provided. There could also be screws. It is possible in particular for the pins 12 to be made of simple plastic, for example, since they do not have to absorb any forces. They serve only to prevent the clamping jaws 11, 21 and 31 from springing away against the force of the spring 38.

It is also possible to dispense completely with pins 12 and instead to use a resilient latching element in which the jaws latch. It is also possible to operate completely without a locking system since, once the device has been inserted into the outer sleeve, the clamping jaws are held by the sleeve surrounding them and no separate locking is necessary.

Instead of three clamping jaws, as used in the exemplary embodiment shown here, it is also possible to use two, four or more clamping jaws. The advantage of the universal gripper lies in the fact that, for the purpose of clamping different diameters, the basic body 10 always remains the same. Thus, it is possible for diameters and shapes of any kind to be gripped or overengaged. In particular, the use of a set of different clamping jaws 11, 21, 31 makes it possible also for non-round material to be able to be machined. The material to be clamped can also be a ball or a cone.

The exchange of an individual clamping jaw is performed by withdrawing or (if a thread is present) unscrewing the pin 12 and inserting a new clamping jaw, with this jaw once more being advantageously secured by a pin 12. According to tests conducted by the Applicant, this operation lasts less than two minutes, although it is also possible to achieve exchange times of less than a minute by suitably designing the locking mechanism. The leaf spring 38 can be replaced in an extremely simple manner since it is merely pushed into the groove 37.

The basic body 10 can be provided with an outer or inner thread, and thus functions either by being actuated under tensile or compressive stress. The size of the basic body, in particular its maximum inside diameter, can be determined as desired, and it is thus possible to achieve a large range of clamping actions with a single basic body. The clamping jaws themselves can be exchanged individually or in batches of three items each (given three clamping jaws), and can be made of many known materials, that is to say in soft form, hardened form or of plastic.

Advantageously, the cone surface 34 is oriented at a 45° angle, i.e. in a 1:1 ratio, so as to be equipped for an overengagement. However, a standard version having an angle of 15° can also be provided, or other angles known to a person skilled in the art can be used. The pins 12 form the jaw-securing means so that the clamping jaws can be exchanged and are adaptable in terms of their dimensions and design since they absorb no loading.

The function of the leaf spring 38 lies in lifting the clamping jaws in the open state. It can be exchanged in a simple manner. The spring 38 particularly presses the front region 42 of the clamping jaw 11 upward, so that the lower surface 14 is set obliquely. Since the rear surface 16 of the clamping jaw 11 is set back, the passage around the longitudinal axis 20 of the basic body 10 does not taper. Consequently, it is possible for an object to be engaged from behind in a simple manner. In the course of the translational movement of the clamping jaw, the complementary surfaces 4 and 34 press each clamping jaw into the horizontal, with the result that the lower surface 14 of each clamping jaw comes to grip while lying flat. This is achieved by each clamping jaw tilting about its pin 12, although no significant forces act on these pins 12.

The Applicant has been able to establish in long-time tests that the concentric running about the clamping axis 20 is excellent, even over large series of clamping actions with the same clamping width, and lies in the range of a few micrometers. Hence, such a universal gripper is by far superior in terms of accuracy to those of the prior art.

This gripper can thus be used in such a versatile way since, given a stroke ratio of 1:1, a longitudinal displacement of the basic body 10 by one millimeter corresponds to a clamping jaw narrowing of 2 millimeters. In this respect, it is possible when the basic body 10 has a sufficiently large design to achieve virtually any overengagement possibility and any overengagement diameter.

LIST OF REFERENCE NUMBERS

1 Universal gripper
2 Sleeve
3 Sleeve
5 Rotary orienting disk
9 End region
10 Basic body
11 Clamping jaw
12 Pin
13 Basic body
14 Clamping jaw lower surface
15 Step
16 Set-back surface
17 Flange surface
18 Bore
19 Clamping jaw upper side
20 Clamping axis
21 Clamping jaw
22 Rear side of the clamping jaw
29 Front surface of the clamping jaw
31 Clamping jaw
32 Central portion of the clamping jaw
33 Stop surface
34 Cone surface
35 Leaf spring bearing surface
36 Circular segment element
37 Slot
38 Leaf spring
39 Free ends of the leaf spring
41 Clamping jaw slot
42 Front side of the clamping jaw
43 Bore
45 Bearing edges
49 Front side of the basic body
51 Central bore
52 Step

The invention claimed is:

1. A chuck comprising:
 a basic body having a longitudinal axis and an oblique clamping surface;
 a plurality of radially continuous, longitudinal slots provided within the basic body;
 an actuating element;
 a plurality of clamping jaws, wherein each clamping jaw comprises:
  a stop surface which extends in the plane perpendicular to the longitudinal axis of the basic body;
  a run-on surface being complementary to said oblique clamping surface of the basic body; and
  an inner clamping surface;

a plurality of spring elements;

wherein the basic body has on its outer side, around the slots, flattened regions on which at least one of the respective spring elements can be fastened, wherein each slot is intended to receive one of the clamping jaws, wherein each clamping jaw can be displaced radially with respect to the basic body if the oblique clamping surface of the basic body and the complementary run-on surface are displaced relative to one another such that said inner clamping surface of each clamping jaw clamps a workpiece to be held around the longitudinal axis of the basic body, wherein the stop surface is exposed to force in the longitudinal direction during clamping through a direct form-fitting connection with a complementary surface of an actuating element or through a form-fitting connection with a complementary surface of the basic body which makes a further form-fitting connection with the actuating element, and wherein the spring elements are leaf springs and wherein the flattened regions merge into tangentially extending slots in which one of the ends of each leaf spring can be fastened, while another end of each leaf spring contacts a lower side of the respective clamping jaw.

2. The chuck as claimed in claim 1, wherein each leaf spring is U-shaped with two free ends which are preloaded away from the flattened regions.

3. The chuck as claimed in claim 1, wherein a bore is provided in the basic body transversely with respect to each slot, which bore crosses the associated slot and into which a fastening element can be inserted in order to hold a clamping jaw.

4. The chuck as claimed in claim 1, wherein two, three, four or N slots are provided in the basic body for a corresponding number of clamping jaws, at a uniform angular spacing of 180 degrees, 120 degrees, 90 degrees or 360/N degrees, where $N \geq 5$.

5. The chuck as claimed in claim 1, wherein the clamping jaw comprises an elongate base body on whose lower side the inner clamping surface is provided, wherein on whose upper side said oblique run-on surface is provided, and wherein on whose bottom side a front clamping surface and a rear, set-back surface are provided in order to create a cavity for engaging behind a workpiece to be clamped.

6. The chuck as claimed in claim 5, wherein the clamping jaw is provided with a continuous oblong hole that is running transversely with respect to the longitudinal axis.

7. The chuck as claimed in claim 1, further comprising a rotary orienting disk having a central, continuous bore which defines a step.

* * * * *